Oct. 17, 1950  R. MARCECA  2,525,923
EGG CUTTER
Filed May 9, 1946

Roy Marceca
INVENTOR

Patented Oct. 17, 1950

2,525,923

UNITED STATES PATENT OFFICE 2,525,923

EGG CUTTER

Roy Marceca, Meadville, Pa.

Application May 9, 1946, Serial No. 668,590

4 Claims. (Cl. 146—2)

1

The present invention relates to an improved egg cutter and in particular to a rotary saw type cutter with means to firmly grip the egg and accurately fix and support the cutter in cutting position thereon.

It is a primary object of the present invention to provide a rotary cutter of great hardness such as a jeweler's blade mounted for accurate rotation about an end section of an egg to effect thereon a clean circular cut with a minimum of effort.

It is a further object to provide a greatly simplified cutter having means to accurately and firmly grip an egg of various sizes while supporting a rotary cutter for cutting thereof.

Referring to the drawings wherein like numbers indicate the same parts:

Figure 1:
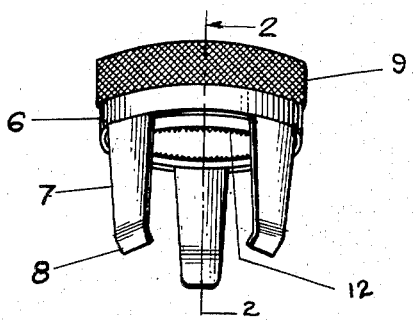
Fig. 1 shows an elevation in perspective of the assembled egg cutter.
Figure 2:
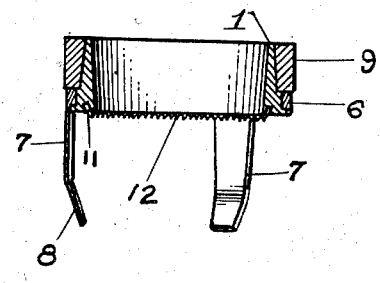
Fig. 2 is a vertical section thru the cutter showing the assembly in detail.
Figure 3:
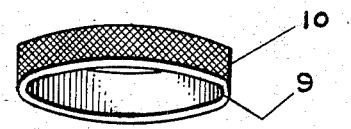
Fig. 3 is a detail of the manually rotating ring.
Figure 4:
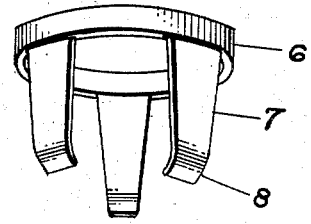
Fig. 4 is a detail of the egg gripping ring and resilient arms carried thereby.
Figure 5:
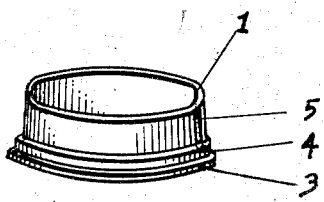
Fig. 5 is a detail of the cutter base or body.
Figure 6:
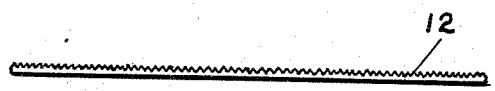
Fig. 6 shows the saw blade.

Referring to the drawings the cutter is built about a tubular or cylindrical ring forming a base 1 which is smoothly bored on the inside, but has a stepped outer surface of varying diameters 3, 4 and 5 to retain operating elements, each step providing a shoulder on which an upper element is retained.

Mounted on step 4 and fitted for rotation is an egg gripping or adaptor ring 6 in which are removably or permanently fixed several, preferably three, resilient egg gripping fingers 7. The lower ends of the fingers are bent inward at 8 to continuously grip the egg and even when removed will grasp the cut section and remove it with the cutter.

The step 5 of the base 1 has pressed or otherwise tightly fitted a ring 9 knurled at 10 for manually grasping and easy rotation of the base 1. The ring 9 also serves to retain on the cutter for easy rotation the gripping ring 6.

The bottom of the base 1 is angularly slotted with respect to the axis at 11 to receive an accurately fitted jeweler's saw blade 12, which in view of the angular slot will be securely but removably retained, the blade, of natural spring-like hardness angularly distorted in slot 11, holding itself against displacement in use. It will be seen moreover that the blade thus angularly retained is in a position of maximum cutting efficiency with respect to the sloping contour of the egg shell.

2

In construction various materials are suitable for some of the parts and for others the suitable materials are limited. Thus the base may be of any material, desirably metal and a light metal such as aluminum or alloys thereof are preferable. The knurled ring likewise is of light metal but may be plastic. The cutting saw is of hard cutting steel or tungsten carbide and the adapter ring 6 and gripping fingers 7 are desirably of resilient spring steel.

In operation, the gripping fingers are fitted about an egg which brings the cutting saw in contact with an end of the egg. Manual rotation of the knurled ring with slight pressure against the egg will easily cut through the shell and by removing thereafter the egg cutter the resilient fingers sliding along the egg shell will grip the cut away portion and remove the same with the cutter. If desired, the cutter may be turned upside down and the egg reinserted in the fingers with the cutter then acting as a support or cup for use of the opened egg.

Certain modifications of the hereindescribed structure will be apparent to one skilled in the art and it is accordingly intended that the above description be considered as exemplary and not limiting except as defined in the claims appended hereto.

I claim:

1. An egg cutter comprising a ring-like base having a radial slot angular to the axis in the lower end thereof closely fitting a normally straight hard spring metal saw blade radially mounted therein whereby the said blade is firmly gripped by the distortion of the straight blade to fit said radial slot, a coaxial annular band having dependent resilient fingers mounted on said base, a knurled ring tightly fitted around the upper part of said base for manual rotation thereof, said knurled ring retaining said band for rotation thereon.

2. An egg cutter comprising a cylindrical ring-like base having three stepped portions of decreasing diameter forming the outer wall thereof, the lowermost stepped portion forming a retaining flange for a rotatable annular ring fitted to the middle stepped portion of the base, said rotatable annular ring having resilient fingers dependent therefrom for gripping an egg, a knurled ring tightly fitting and gripping the upper stepped portion of the base for manual rotation thereof and overlying said middle stepped portion forming an upper flange to rotatably retain the same, and an annular slot angularly cut in the lower end of said base with respect to the axis thereof, said slot having a jeweler's saw blade resiliently constrained in said slot whereby it is firmly but removably gripped therein.

3. An egg cutter comprising a cylindrical base element having an annular slot cut at an angle to the axis of said base element in one end thereof, a hard narrow normally straight spring metal saw blade constrained to the annular contour and closely fitted in said slot for firm but removable support therein, a band element rotatably mounted about said base element and resilient gripping fingers depending from said band element for holding the egg stationary while being cut.

4. An egg cutter comprising a continuous solid open ended metallic cylindrical ring having a diameter approximately similar to the diameter of the end of an average egg of the type to be cut, a continuous annular groove in one end of said ring extending inwardly at an acute angle of less than 90 to the axis of said cylinder, and a hard narrow normally straight spring steel saw blade annularly constrained in said groove, the close fit in said groove and annular constraint of the normally straight saw blade comprising a stable grip of said saw blade in egg cutting position in the end of said cylindrical ring.

ROY MARCECA.

REFERENCES CITED

The following references are of record in the file of this patent:

UNITED STATES PATENTS

| Number | Name | Date |
|---|---|---|
| 706,649 | Gardanier | Aug. 12, 1902 |
| 944,827 | Sheldon | Dec. 28, 1909 |
| 1,109,638 | Stodden | Sept. 1, 1914 |
| 1,491,908 | Grieg | Apr. 29, 1924 |
| 1,648,979 | Bessette | Nov. 15, 1927 |

FOREIGN PATENTS

| Number | Country | Date |
|---|---|---|
| 651,386 | France | Oct. 9, 1928 |